United States Patent

[11] 3,566,170

[72] Inventor George D. Rehklau
 Los Altos, Calif.
[21] Appl. No. 802,499
[22] Filed Feb. 26, 1969
[45] Patented Feb. 23, 1971
[73] Assignee Ampex Corporation
 Redwood City, Calif.

[54] TACHOMETER
 4 Claims, 3 Drawing Figs.
[52] U.S. Cl. .................................................. 310/168,
 324/174
[51] Int. Cl. .................................................. G01p 3/54
[50] Field of Search ........................................... 324/69, 70;
 310/111, 168, 169, 170, (Inquired);
 33/(Inquired); 73/(Inquired); 84/1.01, (Inquired)

[56] References Cited
UNITED STATES PATENTS
2,144,972 1/1939 Hirst ............................. 33/170
2,221,814 11/1940 Reid ............................. 310/170

Primary Examiner—Michael J. Lynch
Attorney—Robert G. Clay

ABSTRACT: A magnetic sensing device emits an alternating signal that is stimulated by rotation of a toothed-type wheel. In place of machined teeth, the wheel has a circumferential row of precision-made steel bearing balls. Thus the needed discontinuities are provided to high precision, but the wheel is inexpensive and easy to manufacture and assemble.

PATENTED FEB23 1971
3,566,170
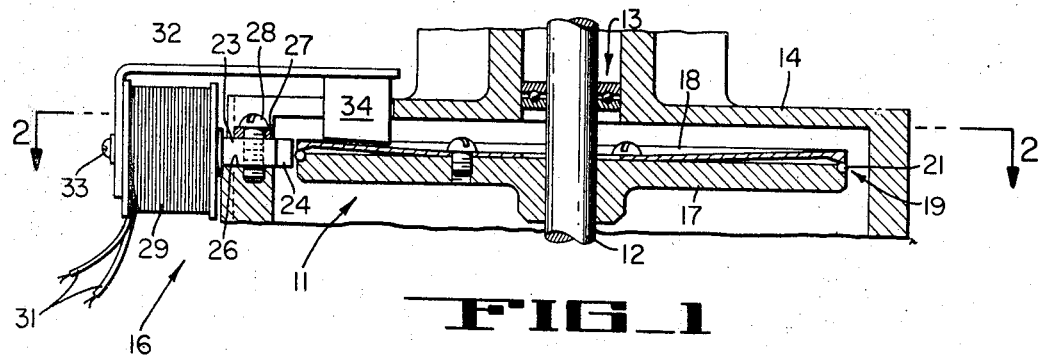
FIG_1
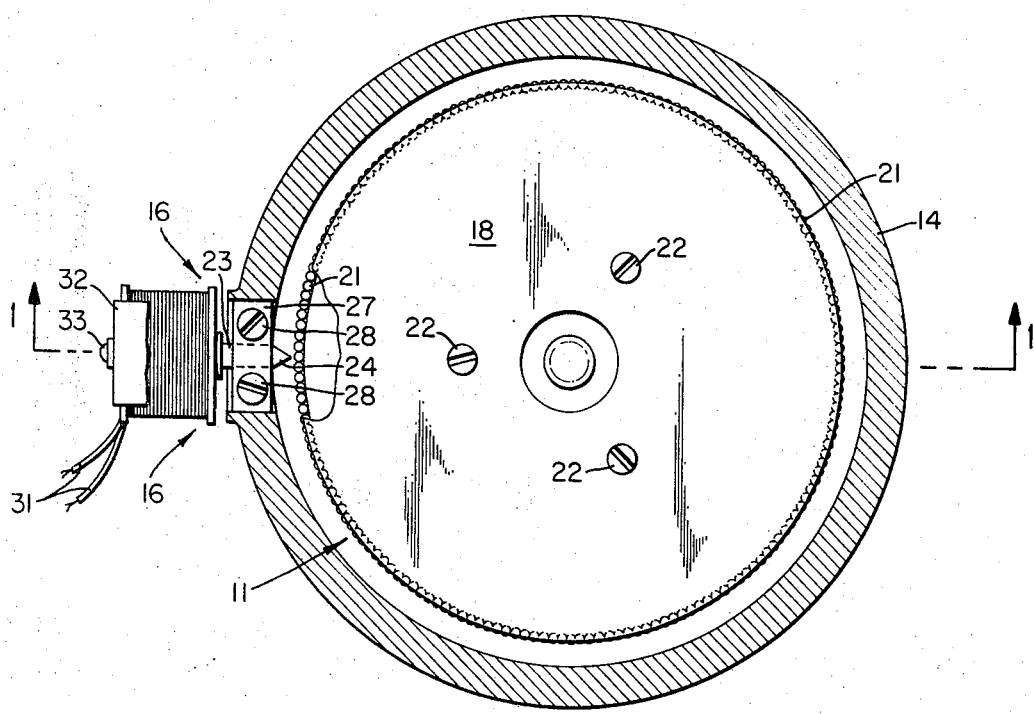
FIG_2
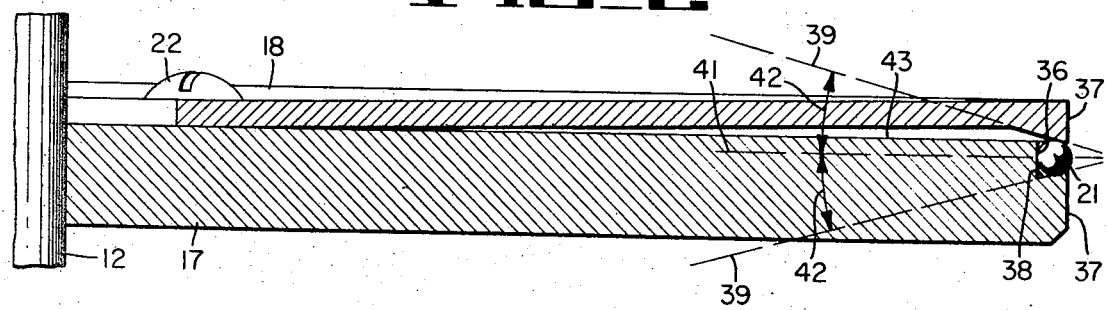
FIG_3
INVENTOR.
GEORGE D. REHKLAU
BY Robert S. Clay
ATTORNEY

TACHOMETER

FIELD OF THE INVENTION

The present invention relates to tachometers, and particularly to tachometers of the toothed-wheel type.

Previously, in the art, tachometers have used toothed wheels or gears with magnetic or optical devices to sense the rotational passage of the teeth of the wheel and to emit an electrical signal consisting of a pulse for each tooth, the frequency of the pulses being a measure of the speed of rotation of the wheel. To provide a high resolution of the output signal, a large number of teeth must be used; and to provide acceptable accuracy, the teeth must be painstakingly machined to precise spacing and other dimension.

Accordingly, it is an object of the present invention to provide a tachometer wheel that has improved precision in the spacing and dimensioning of the discontinuities thereof, but is comparatively less expensive to manufacture and assemble.

These and other objects are achieved in the present invention, in which the tachometer wheel is provided with a peripheral row of precision-made paramagnetic rounded elements such as bearing balls, securely retained in tangential contact with one another all the way around the wheel.

DESCRIPTION OF THE DRAWING

FIG. 1 is a sectional elevation view of the invention, taken along the plane of lines 1–1 of FIG. 2.

FIG. 2 is a broken away sectional plan view of a portion of the apparatus shown in FIG. 1, taken along the plane of lines 2–2 of FIG. 1; and FIG. 3 is an enlarged sectional elevation view of a portion of the apparatus shown in FIG. 1.

DESCRIPTION OF THE PREFERRED EMBODIMENTS

Referring now to the drawing and particularly to FIG. 1, there is shown a tachometer including a wheel 11 that is mounted on a shaft 12, the shaft being mounted for rotation in bearings 13 mounted in a housing 14; and the speed of rotation of the wheel and shaft is sensed by a sensing device 16. In order to provide structural discontinuities suitable for sensing by the device 16, the wheel 11 is formed in two parts 17 and 18 that fit together to define a peripheral groove 19 in which are seated a number of precision-made bearing balls 21, with portions of each ball projecting radially from the wheel for exposure to the sensing device 16.

Referring to FIGS. 1 and 2 together, there is shown how the balls 21 are arranged to fit snugly in contact with one another all around the periphery of the wheel, and the two parts 17, 18 of the wheel are retained together by means of three circumferentially equispaced bolts 22. The sensing device 16 is formed as a magnetic pickup as follows. A soft iron core member 23, having a sharp edged wedge-shaped sensing tip 24 is mounted in a side recess 26 of the housing 14 so as to project radially inwardly with the tip 24 very slightly spaced from the row of balls 21. The core member 23 is retained in the housing as by means of a bracket 27 and a pair of bolts 28 threaded into the housing. On the exteriorly projecting portion of core member 23 there is mounted a coil member 29, having leads 31 for transmitting an electrical signal. On the exterior end of the core member 23 there is mounted a bracket 32 as by means of a bolt 33; and the bracket 32 serves to mount a high-strength permanent magnet 34 in close proximity to the upper side of the wheel 11. Thus it will be seen that a magnetic circuit induced by the magnet 34 is formed between the magnet and the wheel, including balls 21, across the gap between the balls and the core member 23, through the core member and coil member 29, bracket 32 and back to the magnet 34. The turns of the wire on the coil 29 are linked with the magnetic lines of force of this magnetic circuit. As the wheel rotates and the balls pass successively past core tip 24, the gap between the wheel and core tip is periodically varied in dimension so as to constitute a variable reluctance in the magnetic circuit, and an electrical pulse is emitted by the coil leads 31 for the passage of each ball. The frequency of the emitted signal is of course a function of the speed of rotation of the wheel.

It will be understood that to provide a tachometer of high resolution with inexpensive electrical circuits, it is necessary to have a very large number of structural discontinuities such as are represented by the balls 21 or the teeth of a conventional tachometer-toothed-wheel. The precision-made bearing balls used in an actual embodiment of the present invention number 192 and are each one-sixteenth inch in diameter, to a tolerance of plus or minus 50 millionths of an inch. The cost of such balls on the commercial market is at present about five mills apiece. It will therefore be clear that the use of the balls 21 as "teeth" for a wheel provides an improved dimensional precision coupled with substantial economy of manufacturing cost and assembly time, compared to the precision, cost and manufacturing difficulty of the standard toothed wheel previously known in the art.

FIG. 3 shows in greater detail the manner in which the wheel is constructed and assembled to accommodate and retain the balls 21. The lower disc 17 is formed as a thick plate, cut away at the periphery to define a right-circular cylindrical wall 36 facing radially outwardly to seat the balls 21. The diameter of the wall 36 is carefully dimensioned so that when all of the balls are firmly seated against wall 36, the balls are all tightly engaged with one another and are in fact slightly compressed and diametrically distorted in a circumferential direction of the wheel. This slight distortion is deliberately planned so as to ensure that all of the balls are actually in contact with one another around the wall, and that no spaces are left between them. To hold the balls in such a compressed position required a force fit; and the necessary force is provided as by means of a pair of hollow beveled lips 37 on the peripheries of the two discs 17, 18. The confronting wall 38 of the lip 37 are formed on conical surfaces that expand radially outwardly and toward one another from vertices on the axis of the wheel, as shown by dashed lines 39, and the conical surfaces 39 intersect on a central axis plane 41 of the wheel. In an actual construction of the invention, the dihedral angle 42 between the conical surfaces 39 and the plane 41 is about 15°. The axial dimension of the wall 36 terminating in the upper surface 43 of the lower disc 17 is determined in relation to the diameter of the balls 21 so that when the balls are seated against the wall 36 and the lower lip wall 38, the upper plate 18 is spaced substantially away from the lower disc 17 in an axial direction near the peripheries of the discs. Except for the lip portion 37, the upper disc 18 is formed as a flat plate, but it is very thin and is made of springy material, so that when the bolts 22 are tightened, they distort the central portion of the disc 18 downwardly and into contact with the lower disc 17. The upper disc 18 thus continues a spring disc which is loaded so as to cause the two lips 37 to enclasp the balls and urge them radially inwardly into compressed engagement with the wall 36. It will be seen that because of the angle 42 of the surfaces 38 of the lips 37, the surfaces 38 engage the balls tangentially at points that lie farther from the wheel axis than do the centers of the balls, and the wedging and force-fit action previously described is thus ensured. The enclasping action of the lips 37 also ensures that the balls are retained against the action of centrifugal forces when the wheel is rotating. The radial depth of the cut that defines the wall 36 is predetermined to be slightly less than the diameter of the balls, so that when firmly seated, the balls still project very slightly radially outwardly of the periphery wall and are thus exposed to the sensing action of the device 16.

The assembly of the balls on the disc 17 with the force-fit above described has been found to be very easily accomplished by the following method. A thick rubber Teflon band is looped around the periphery of the disc 17 so as to define an exterior rim confronting the wall 36. The bearing balls are then poured loosely into the assembly like birdshot, and they quickly roll around and can be pressed into their places in the recess defined by the walls 36 and 38, except of course for the last ball, which usually remains humped up above the wall 38 and resting tangentially on the two adjacent balls. The operator then with his finger presses the last ball down into seated engagement with the wall 38. The process is a "snap" action which forces all of the balls into their compressed condition. It has been found that when the last ball is snapped into place, none of the other balls pop up or lose their places, because all of the balls project slightly beyond the perimeter of the disc 17 and are frictionally embedded in the Teflon band that surrounds the disc. This band then serves to hold the balls in place until the upper plate 18 is assembled on the disc 17 and is retained in springloaded condition thereon as by tightening of the bolts 22. The Teflon band may then be removed.

It will be understood that many variation of the structure may be employed, as for example to arrange the bearing balls on an axial end face of the wheel; and either projecting or not from the wheel or to accommodate precision-made roller bearings elements of other types, such as right-circular cylindrical or truncated-conical bearing elements; or to apply a sensing device to a conventional full-race bearing to produce the tachometer of the invention, without departing from the scope of the invention as defined in the appended claims.

Thus there has been described a tachometer including a magnetic sensing device emitting a signal that is stimulated by rotation of a toothed-type wheel. In place of machined teeth, the wheel has a circumferential row of precision-made bearings balls. Thus the needed discontinuities are provided to high precision, but the wheel is inexpensive and easy to manufacture and assemble.

I claim:

1. A tachometer of the type including a relatively moving sensing and sensed members, wherein:

said sensed member comprises a circular tachometer wheel with a plurality of precision-made steel bearing balls mounted on the periphery of to define teeth and arranged in tangential engagement with one another for rotation along a predetermined circular path for exposure to said sensing member;

said sensing member includes a magnetic pickup device disposed adjacent to said path for sensing relative movement of said balls and for producing an electrical output signal pulse upon the passage of each ball;

said tachometer wheel is formed in two parts fitting together to define a peripheral groove for seating said balls with portions of each ball projecting radially from said wheel for exposure to said sensing members;

said groove having an inner peripheral dimension such that said balls fit snugly in contact with one another all the way around the periphery of said wheel; and said wheel parts also being formed with confronting peripheral lips for enclasping and retaining said balls against the action of centrifugal forces.

2. A tachometer as recited in claim 1, wherein:

one of said tachometer wheel parts is formed as a first disc cut away at the periphery thereof to define one of said lips and an inner periphery wall for said groove; and the other of said tachometer wheel parts is formed as a second disc that is axially secured to said first disc and is formed with the other of said lips at the periphery thereof.

3. A tachometer as recited in claim 2, wherein:

said first disc is formed with a hub portion extending axially toward said second disc and mating with a corresponding hub opening in said second disc; and said second disc being engaged with said first disc only in the vicinity of said hub portion, and being axially spaced from said first disc at all other points, as by the engagement of the second disc lip with said balls in said groove.

4. A tachometer of the type including relatively moving sensing and sensed members, wherein;

said sensed member comprises a circular tachometer wheel with a plurality of precision-made bearing balls mounted on the periphery thereof to define teeth and arranged in tangential engagement with one another for rotation along a predetermined circular path for exposure to said sensing member;

said sensing member is disposed adjacent to said path for sensing relative movement of said balls with respect to said sensing member along said path;

said wheel being formed with a pair of discs fitting together and defining at least one right-circular cylindrical wall facing radially outwardly;

said plurality of precision-made bearing balls engaging said wall and tangentially engaging one another to form a circumferential row of said balls around said wheel;

said balls engaging said wall in said row being compressed and diametrically distorted in a circumferential direction of said wheel;

said discs having a circumferential hollow beveled lip at the peripheral portion thereof, with confronting walls of said lips being formed on conical surfaces expanding radially outwardly and toward one another from vertices on the axis of said wheel and intersecting on a central axial plane of said wheel, so that said lip walls engage said bearing balls tangentially at points that lie farther from the wheel axis than do the centers of said balls and so that said lips enclasp said balls and retain said balls in engagement with said cylindrical wall of said wheel, with said balls projecting radially beyond the periphery of said wheel;

said discs being formed with axial thickness such that they remain spaced apart at the peripheries thereof when said lips enclasp said balls; and at least one of said discs being formed of spring material and being secured axially to said other disc near the axis of said wheel so as to distort said spring disc into a cup shape and springily load said lips to retain said balls in said compressed engagement with said cylindrical wall of said wheel.